US008606046B2

(12) United States Patent
Bern et al.

(10) Patent No.: US 8,606,046 B2
(45) Date of Patent: Dec. 10, 2013

(54) SYSTEM AND METHOD FOR CLEAN DOCUMENT RECONSTRUCTION FROM ANNOTATED DOCUMENT IMAGES

(75) Inventors: Marshall W. Bern, San Carlos, CA (US); Alejandro E. Brito, Mountain View, CA (US); Francois Ragnet, Venon (FR)

(73) Assignees: Palo Alto Research Center Incorporated, Palo Alto, CA (US); Xerox Corporation, Norwalk, CT (US)

( * ) Notice: Subject to any disclaimer, the term of this patent is extended or adjusted under 35 U.S.C. 154(b) by 771 days.

(21) Appl. No.: 12/819,656

(22) Filed: Jun. 21, 2010

(65) Prior Publication Data

US 2011/0311145 A1 Dec. 22, 2011

(51) Int. Cl.
*G06T 7/00* (2006.01)

(52) U.S. Cl.
USPC ............ 382/294; 382/195; 382/275; 715/233

(58) Field of Classification Search
CPC ..... G06T 5/001; G06T 7/0028; G06T 7/0081; G06F 17/241
USPC ........................... 382/195, 275, 294; 715/233
See application file for complete search history.

(56) References Cited

U.S. PATENT DOCUMENTS

| 5,671,282 | A | | 9/1997 | Wolff et al. |
| 5,692,073 | A | * | 11/1997 | Cass ............................. 382/219 |
| 6,614,929 | B1 | * | 9/2003 | Yokota ........................... 382/175 |
| 6,968,085 | B2 | | 11/2005 | Bern et al. |
| 7,526,129 | B2 | * | 4/2009 | Bargeron ....................... 382/179 |
| 8,224,092 | B2 | | 7/2012 | Bressan |
| 2010/0067793 | A1 | | 3/2010 | Serrano |
| 2011/0078191 | A1 | | 3/2011 | Ragnet |

FOREIGN PATENT DOCUMENTS

EP 1 229 485 A2 8/2002

OTHER PUBLICATIONS

Tang, et al. "Information Acquisition and Storage of Forms in Document Processing", Proceedings of the 4th Intl. Conf. on Document Analysis and Recognition, Aug. 18-20, 1997, vol. 1, p. 170-174.
Ye, et al. "A Generic System to Extract and Clean Handwritten Data From Business Forms", Proceedings of the 7th Intl. Workshop on Frontiers in Handwriting Recognition, Sep. 11, 2000, pp. 63-72.
Ming Ye, Marshall Bern, and David Goldberg, and Ming Ye "Document image matching and annotation lifting", Proc. Sixth International Conf. on Document Analysis and Recognition (ICDAR), 2001, 753-758.

* cited by examiner

*Primary Examiner* — Vikkram Bali
*Assistant Examiner* — Jose M Torres
(74) *Attorney, Agent, or Firm* — Fay Sharpe LLP

(57) ABSTRACT

A computer-implemented method and system for reconstructing a clean document from annotated document images and/or extracting annotations therefrom are provided. The method includes receiving a set of at least two annotated document images into computer memory, selecting a representative image from the set of annotated document images, performing a global alignment on each of the set of annotated document images with respect to the selected representative image, and forming a consensus document image based at least on the aligned annotated document images. A clean document based at least on the consensus document image is then formed which can be used for extracting the annotations.

26 Claims, 14 Drawing Sheets

| BUDGET WORKSHEET | | | |
|---|---|---|---|
| MONTH/YEAR ____ /____      AMOUNT AVAILABLE $ _____ | | | |
| USE THIS WORKSHEET TO MANAGE YOUR SPENDING MONEY. THIS WILL HELP YOU KEEP TRACK OF WHERE YOUR MONEY IS GOING EACH MONTH. IF YOU ARE SPENDING TOO MUCH MONEY IN ONE OR MORE CATEGORIES, CUT BACK OR ADJUST THE AMOUNT FROM OTHER AREAS AS NEEDED. | | | |
| SPENDING CATEGORIES | WEEK 1 | WEEK 2 | WEEK 3 |
| FOOD:                           P4 / P3 | $ ____ | $ ____ | $ ____ |
| ENTERTAINMENT: | $ ____ | $ ____ | $ ____ |
| CLOTHING: | $ ____ | $ ____ | $ ____ |
| HOUSEHOLD ITEMS: | $ ____ | $ ____ | $ ____ |
| RENT: | $ ____ | $ ____ | $ ____ |
| TRANSPORTATION: | $ ____ | $ ____ | $ ____ |
| OTHER: | $ ____ | $ ____ | $ ____ |
| TOTAL: | $ ____ | $ ____ | $ ____ |

FIG. 1

| BUDGET WORKSHEET ||||
|---|---|---|---|
| MONTH/YEAR Nov / 2010   AMOUNT AVAILABLE $ 1500 ||||
| USE THIS WORKSHEET TO MANAGE YOUR SPENDING MONEY. THIS WILL HELP YOU KEEP TRACK OF WHERE YOUR MONEY IS GOING EACH MONTH. IF YOU ARE SPENDING TOO MUCH MONEY IN ONE OR MORE CATEGORIES, CUT BACK OR ADJUST THE AMOUNT FROM OTHER AREAS AS NEEDED. ||||
| SPENDING CATEGORIES | WEEK 1 | WEEK 2 | WEEK 3 |
| FOOD: Apples, Bananas, Pizza, Cookies, Butter | $ 89 | $ 73 | $ 109 |
| ENTERTAINMENT: Movies, Videogames, Books | $ 52 | $ 97 | $ 65 |
| CLOTHING: Hat, Mittens, Shoes, Shirts | $ 20 | $ 37 | $ 16 |
| HOUSEHOLD ITEMS: Towels, Soap, Tupperware | $ 108 | $ 42 | $ 38 |
| RENT: 742 Evergreen Terrace | $ 850 | $ 850 | $ 850 |
| TRANSPORTATION: Car, Truck, Gas | $ 237 | $ 250 | $ 224 |
| OTHER: Diapers, Paint, Utilities | 453 $ 100 | $ 150 | $ 150 |
| TOTAL: | $ 1456 | $ 1499 | $ 1452 |

FIG. 2

| BUDGET WORKSHEET | | | |
|---|---|---|---|
| MONTH/YEAR  Feb /2009     AMOUNT AVAILABLE $ 1600 | | | |
| USE THIS WORKSHEET TO MANAGE YOUR SPENDING MONEY. THIS WILL HELP YOU KEEP TRACK OF WHERE YOUR MONEY IS GOING EACH MONTH. IF YOU ARE SPENDING TOO MUCH MONEY IN ONE OR MORE CATEGORIES, CUT BACK OR ADJUST THE AMOUNT FROM OTHER AREAS AS NEEDED. | | | |
| SPENDING CATEGORIES | WEEK 1 | WEEK 2 | WEEK 3 |
| FOOD:  Eggs, Peanut Butter, Sandwiches, Flour | $ 46 | $ 140 | $ 104 |
| ENTERTAINMENT: Baseball Season Tickets, Movies, Game night | $ 45 | $ 104 | $ 87 |
| CLOTHING:  Coat, Bandana, Sunglasses | $ 100 | $ 137 | $ 160 |
| HOUSEHOLD ITEMS: Paper Towels, Silverware, Tire Cleaner | $ 125 | $ 43 | $ 147 |
| RENT:  618 Hillcrest Dr. | $ 600 | $ 600 | $ 600 |
| TRANSPORTATION: Train Pass | $ 125 | $ 125 | $ 125 |
| OTHER: Utilities, Insurance, Gym membership | 453 $ 175 | $ 175 | $ 200 |
| TOTAL: | $ 1216 | $ 1324 | $ 1423 |

| BUDGET WORKSHEET || | | |
|---|---|---|---|---|
| MONTH/YEAR ___ / 20 ___   AMOUNT AVAILABLE $ _____ — 12 |||||
| USE THIS WORKSHEET TO MANAGE YOUR SPENDING MONEY. THIS WILL HELP YOU KEEP TRACK OF WHERE YOUR MONEY IS GOING EACH MONTH. IF YOU ARE SPENDING TOO MUCH MONEY IN ONE OR MORE CATEGORIES, CUT BACK OR ADJUST THE AMOUNT FROM OTHER AREAS AS NEEDED. |||||
| SPENDING CATEGORIES || WEEK 1 | WEEK 2 | WEEK 3 |
| FOOD:<br>12 — ▒▒▒▒▒▒ || $ ___ | $ ___ | $ ___ |
| ENTERTAINMENT:<br>▒▒▒▒▒▒▒▒ || $ ___ | $ ___ | $ ___ |
| CLOTHING:<br>▒▒▒▒▒▒▒▒ || $ ___ | $ ___ | $ ___ |
| HOUSEHOLD ITEMS:<br>▒▒▒▒▒▒ ▒▒▒▒ || $ ___ | $ ___ | $ ___ |
| RENT: ▒▒▒▒▒▒ || $ ___ | $ ___ | $ ___ |
| TRANSPORTATION: ▒▒▒▒▒ || $ ___ | $ ___ | $ ___ |
| OTHER:<br>12 — ▒▒▒▒<br>▒▒▒▒▒▒<br>▒▒▒▒▒▒ || $ ___ | $ ___ | $ ___ |
| TOTAL: || $ ___ | $ ___ | $ ___ |

FIG. 11

Apples, Bananas, Pizza,
Cookies, Butter

FIG. 12

BUDGET WORKSHEET

MONTH/YEAR  Feb / 2009        AMOUNT AVAILABLE $ 1600

USE THIS WORKSHEET TO MANAGE YOUR SPENDING MONEY. THIS WILL HELP YOU KEEP TRACK OF WHERE YOUR MONEY IS GOING EACH MONTH. IF YOU ARE SPENDING TOO MUCH MONEY IN ONE OR MORE CATEGORIES, CUT BACK OR ADJUST THE AMOUNT FROM OTHER AREAS AS NEEDED.

| SPENDING CATEGORIES | WEEK 1 | WEEK 2 | WEEK 3 |
|---|---|---|---|
| FOOD: Eggs, Peanut Butter, Sandwiches, Flour | $ 46 | $ 140 | $ 104 |
| ENTERTAINMENT: Baseball Season Tickets, Movies, Game night | $ 45 | $ 104 | $ 87 |
| CLOTHING: Coat, Bandana, Sunglasses | $ 100 | $ 137 | $ 160 |
| HOUSEHOLD ITEMS: Paper Towels, Silverware, Tire Cleaner | $ 125 | $ 43 | $ 147 |
| RENT: 618 Hillcrest Dr. | $ 600 | $ 600 | $ 600 |
| TRANSPORTATION: Train Pass | $ 125 | $ 125 | $ 125 |
| OTHER: Utilities, Insurance, Gym membership | $ 175 | $ 175 | $ 200 |
| TOTAL: | $ 1216 | $ 1324 | $ 1423 |

| BUDGET WORKSHEET |||||
|---|---|---|---|---|
| MONTH/YEAR Feb / 2009 AMOUNT AVAILABLE $ 1600 |||||
| USE THIS WORKSHEET TO MANAGE YOUR SPENDING MONEY. THIS WILL HELP YOU KEEP TRACK OF WHERE YOUR MONEY IS GOING EACH MONTH. IF YOU ARE SPENDING TOO MUCH MONEY IN ONE OR MORE CATEGORIES, CUT BACK OR ADJUST THE AMOUNT FROM OTHER AREAS AS NEEDED. |||||
| SPENDING CATEGORIES || WEEK 1 | WEEK 2 | WEEK 3 |
| FOOD: | Eggs, Peanut Butter, Sandwiches, Flour | $ 46 | $ 140 | $ 104 |
| ENTERTAINMENT: | Baseball Season Tickets, Movies, Game night | $ 45 | $ 104 | $ 87 |
| CLOTHING: | Coat, Bandana, Sunglasses | $ 100 | $ 137 | $ 160 |
| HOUSEHOLD ITEMS: | Paper Towels, Silverware, Tire Cleaner | $ 125 | $ 43 | $ 147 |
| RENT: | 618 Hillcrest Dr | $ 600 | $ 600 | $ 600 |
| TRANSPORTATION: | Train Pass | $ 125 | $ 125 | $ 125 |
| OTHER: | Utilities, Insurance, Gym membership | $ 175 | $ 175 | $ 200 |
| TOTAL: || $ 1216 | $ 1324 | $ 1423 |

FIG. 14

SYSTEM AND METHOD FOR CLEAN DOCUMENT RECONSTRUCTION FROM ANNOTATED DOCUMENT IMAGES

BACKGROUND

The exemplary embodiment relates to a system and method for reconstructing a clean document from a set of annotated document images.

It is common for a given form to be completed by a number of users and submitted for processing, which generally includes scanning the form and identifying the user's additions. The separation of variable text (e.g., names, addresses, dates, dollar amounts, etc.) from fixed text in filled-out (annotated) forms can be difficult in the realm of document scanning services. If the locations of fields of the form, where the user has entered the information, are known, the separation is relatively easy. However, particularly with forms that may have been created at some time in the past, this information is often not available.

Thus, it is desirable to have a method for separating annotated data from annotated document images that is almost entirely automated, even for new types of forms that have never been encountered before.

INCORPORATION BY REFERENCE

The following references, the disclosures of which are incorporated herein in their entireties by reference, are mentioned:

U.S. Pat. No. 6,968,085, entitled DOCUMENT MATCHING AND ANNOTATION LIFTING, which issued Nov. 22, 2005, to Bern, et al., discloses a method for matching an original document image with a copy image. The original document image is defined as an ensemble of blocks, each of the blocks having neighboring blocks. A mask is formed for each of the blocks by dilating foreground pixels included in the block. A best match is searched in the copy image, for each of the blocks, using a search window, by correlating pixels in the mask with pixels in a corresponding portion in the copy image. Each of the best matches has a matching score. Each of the blocks is indicated as "unmatched" when the corresponding matching score is less than a matching threshold. A displacement vector is then computed for each of the matched blocks.

U.S. application Ser. No. 12/169,101, entitled WORD DETECTION METHOD AND SYSTEM, filed on Jul. 8, 2008, discloses a method of characterizing a word image that includes traversing the word image in steps with a window and at each of a plurality of the steps, identifying a window image. For each of the plurality of window images, a feature is extracted. The word image is characterized, based on the features extracted from the plurality of window images, wherein the features are considered as a loose collection with associated sequential information.

U.S. application Ser. No. 12/212,964, entitled HANDWRITTEN WORD SPOTTER USING SYNTHESIZED TYPED QUERIES, filed on Sep. 18, 2008, discloses a word-spotting system and method for processing candidate word images extracted from handwritten documents. In response to a user inputting a selected query string, such as a word to be searched in one or more of the handwritten documents, the system automatically generates at least one computer-generated image based on the query string in a selected font or fonts. A model is trained on the computer-generated image(s) and is thereafter used in the scoring the candidate handwritten word images. The candidate or candidates with the highest scores and/or documents containing them can be presented to the user, tagged, or otherwise processed differently from other candidate word images/documents.

U.S. application Ser. No. 12/567,920, entitled HANDWRITTEN DOCUMENT CATEGORIZER AND METHOD OF TRAINING, filed Sep. 28, 2009, discloses a method and an apparatus for training a handwritten document categorizer. For each category in a set into which handwritten documents are to be categorized, discriminative words are identified from the OCR output of a training set of typed documents labeled by category. A group of keywords is established including some of the discriminative words identified for each category. Samples of each of the keywords in the group are synthesized using a plurality of different type fonts. A keyword model is then generated for each keyword, parameters of the model being estimated, at least initially, based on features extracted from the synthesized samples. Keyword statistics for each of a set of scanned handwritten documents labeled by category are generated by applying the generated keyword models to word images extracted from the scanned handwritten documents. The categorizer is trained with the keyword statistics and respective handwritten document labels.

BRIEF DESCRIPTION

In one aspect of the exemplary embodiment, a computer-implemented method for reconstructing a document from annotated document images is provided. The method includes receiving a set of at least two annotated document images into computer memory, the annotated document images each comprising static elements and annotated data, and performing an alignment on each annotated document image with respect to at least one other annotated document image in the set of annotated document images. A consensus document image is then formed based on the aligned annotated document images in which at least some annotation data derived from the aligned annotated document images is obscured. Then consensus document image is then output.

In another aspect, a computer-based system for reconstructing a clean document from annotated document images is provided. The system includes a computer processor and computer memory which stores a representative scan selection module, a global alignment module, a consensus image forming module, and a clean up module. The representative scan selection module is configured to receive a set of at least two annotated document images, and select a representative image from the set of annotated document images. The global alignment module is configured to perform a global alignment on each annotated document image with respect to the selected representative image. The consensus image-forming module is configured to form a consensus document image based at least on the aligned annotated document images. The clean-up module is configured to form a clean document based at least on the consensus document image, and output the clean document. The computer processor implements the modules.

In yet another aspect, a computer program product includes tangible media encoding instructions which, when executed on a computer, perform a method which includes, for a set of annotated document images, selecting a representative image from the set of annotated document images, performing a global alignment on each of a plurality of other images in the set of annotated document images with respect to the selected representative image to form a set of aligned annotated document images, forming a consensus document image based on the set of aligned annotated document images, and forming a clean document based on the consensus document image. For each of the annotated document images, the annotated image is compared with the clean image to identify annotations and the annotations are output.

BRIEF DESCRIPTION OF THE DRAWINGS

FIG. 1 graphically illustrates a clean document without annotation data;

FIGS. 2 and 3 graphically illustrate the clean document of FIG. 1 with annotation data added;

FIG. 11 illustrates a consensus image containing noise;

FIG. 12 illustrates annotated data extracted from the annotated document image of FIG. 2;

FIG. 13 illustrates initial blocks selected by the global alignment method of FIG. 6 with respect to the annotated document image of FIG. 3; and FIG. 14 illustrates secondary blocks used by the local alignment method of FIG. 9 with respect to the annotated document image of FIG. 3.

DETAILED DESCRIPTION

Disclosed herein are a method and system for reconstructing a clean document from a set of annotated document images.

As used herein, a "clean document" is a document with a fixed page layout containing static elements such as fixed text, fixed boundaries and other page elements intended to be reproduced on all like documents. For example, FIG. 1 illustrates an example clean document 2. The clean document 2 can be considered as a blank form that is to be filled out (annotated) with information by a user. Accordingly, annotated documents are modified clean documents containing variable data (annotations) added by a user or other agent (such as a computer system). Annotated document images are one or more images from an annotated document that have been scanned, downloaded, or otherwise input into computer memory. FIGS. 2 and 3 illustrate example annotated document images 4, 6.

In the exemplary embodiment, a multi-parameter transformation is performed on document images that allows for rotation, translation, and separate scaling of x and y coordinates. This achieves a global alignment between two or more annotated document images. After alignment of multiple documents, the exemplary method and system computes a new image that contains pixels common to a plurality of annotated document images. This contrasts with earlier methods of alignment where the initial global transformation was simply a translation of one page image relative to the other.

Figure 4:
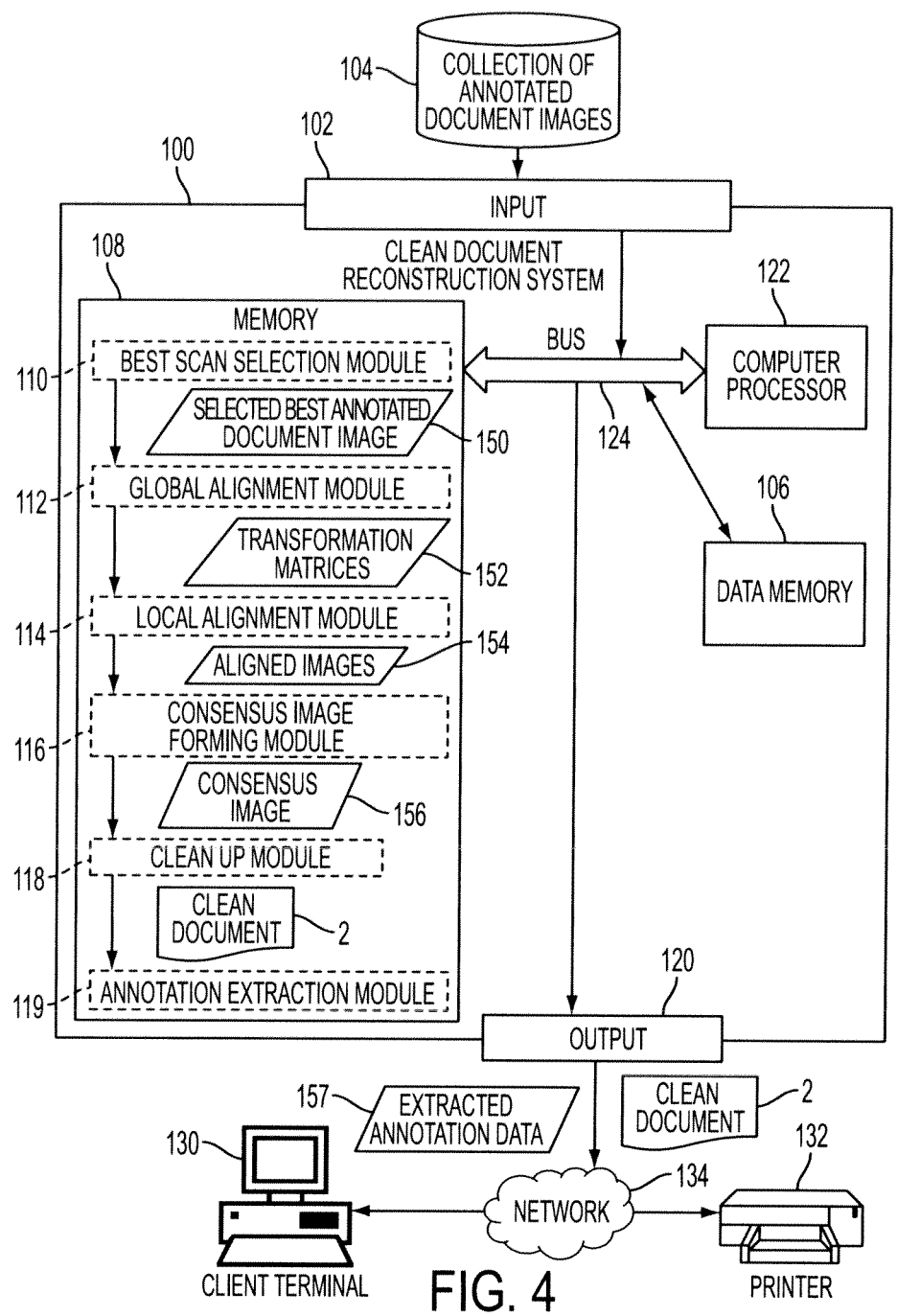
FIG. 4 is a high-level overview of an exemplary system for reconstructing a clean document from a set of annotated document images.

With reference to FIG. 4, an exemplary system 100 for reconstructing a clean document 2 from a set of annotated document images is illustrated. The system 100 includes an input device 102, for receiving a set of annotated document images 104. In order to simplify the explanation of the exemplary system and method presented herein, it is assumed that the set of annotated document images 104 consists of two or more annotated document images corresponding to a single clean document 2, although the same method and system can be used to process a collection of annotated document images corresponding to a plurality of clean documents. Prior to inputting, the set of annotated document images 104 may be stored in any suitable tangible media such as a ROM or RAM drive, generated by a scanner, and/or may be input into the system 100 in the form of a carrier wave, e.g., via the Internet. Alternatively, the annotated document images 104 may be generated within the system 100, itself. The input device 102 may include a modem link, a wired or wireless connection, USB port, floppy or hard disk receiver, or the like and may be separated or combined with other components of the system 100.

The system 100 includes data memory 106 for storing the annotated document images 104 during processing. Main memory 108 of the system 100 stores a representative scan selection module 110, a global alignment module 112, an optional local alignment module 114, a consensus image forming module 116, a clean up module 118, and an annotation extraction module 119. Outputs from modules 110, 112, 114, 116, 118 and 119 may be stored in memories 106, 108 or output via an output device 120 to one or more of a client terminal 130 or a printer 132, optionally through a network 134 such as the internet.

The optional representative scan selection module 110 receives as input the set of annotated document images 104 via the input device 102 and selects an annotated document image 150 from the set of annotated document images 104 that is considered to be (the "best") representative of the set of annotated document images 104. The selected representative annotated document image 150 is then passed from the scan selection module 110 to the global alignment module 112. The global alignment module 112 performs a rigid transformation (such as rotation and/or translation) on each of the other annotated document images 104 to align them more closely with the selected representative annotated document image 150. If a representative annotated document image was not selected (since it is an optional step), the global alignment module 112 performs a rigid and/or relative transformation on each annotated document image 104 with respect to other location information. For example, the global alignment module 112 may align each annotated document image so that each has a top line of text (or a certain line in the document) that is parallel to, and has a fixed distance from, the edge of the image. The output of the global alignment module 112 is a set of transformations such as a transformation matrix 152 that is passed to the optional local alignment module 114. The local alignment module 114 further aligns the set of annotated document images 104 with respect to the selected representative document image 150 by using techniques that, among other things, correct page curls, keystoning (such as a picture taken from an oblique angle), etc. The output of the local alignment module 114 is a set of aligned document images 154 that are passed to the consensus image forming module 116. The consensus image forming module 116 processes each aligned image and identifies pixels geometrically common to at least a plurality of the aligned images to form a consensus image 156. The threshold number of annotated document images required to have a common pixel before that pixel is identified as belonging in the consensus image 156 depends on the system implementation and is described in more detail below. After the consensus image forming module 116 forms the consensus image 156, the consensus image 156 is then optionally passed to the clean up module 118. The clean up module 118 identifies unwanted artifacts in the consensus image 156 such as salt-and-pepper noise, and outputs a clean document 2 to one or more of memories 106, 108, a client terminal 130 and a printer 132. The annotation extraction module 119 extracts annotation information from each of the annotated document images 114 by comparing the annotated document images to the clean document 2.

In the exemplary system, the components 110, 112, 114, 116, 118 and 119, comprise software instructions stored in main memory 108, which are executed by a computer processor 122. The processor 122, such as the computer's CPU, may control the overall operation of the computer system 100 by execution of processing instructions stored in memory 108. Components 102, 106, 108, 110, 112, 114, 116, 118, 119, 120, and 122 may be connected by a data control bus 124. As will be appreciated, system 100 may include fewer or more components while still having the same functionality. For example, components 110, 112, 114, 116, 118, 119 may be combined to form fewer components, or may be functionally separated to form more individual components.

As will be appreciated, the clean document reconstruction system 100 may comprise one or more computing devices, such as a personal computer, PDA, laptop computer, server computer, scanning device with document processing capability, or a combination thereof. Memories 106, 108 may be integral or separate and may represent any type of computer readable medium such as random access memory (RAM), read only memory (ROM), magnetic disk or tape, optical disk, flash memory, or holographic memory. In one embodiment, the memories 106, 108 comprise a combination of random access memory and read only memory. In some embodiments, the processor 122 and memory 106 and/or 108 may be combined in a single chip.

Figure 5:
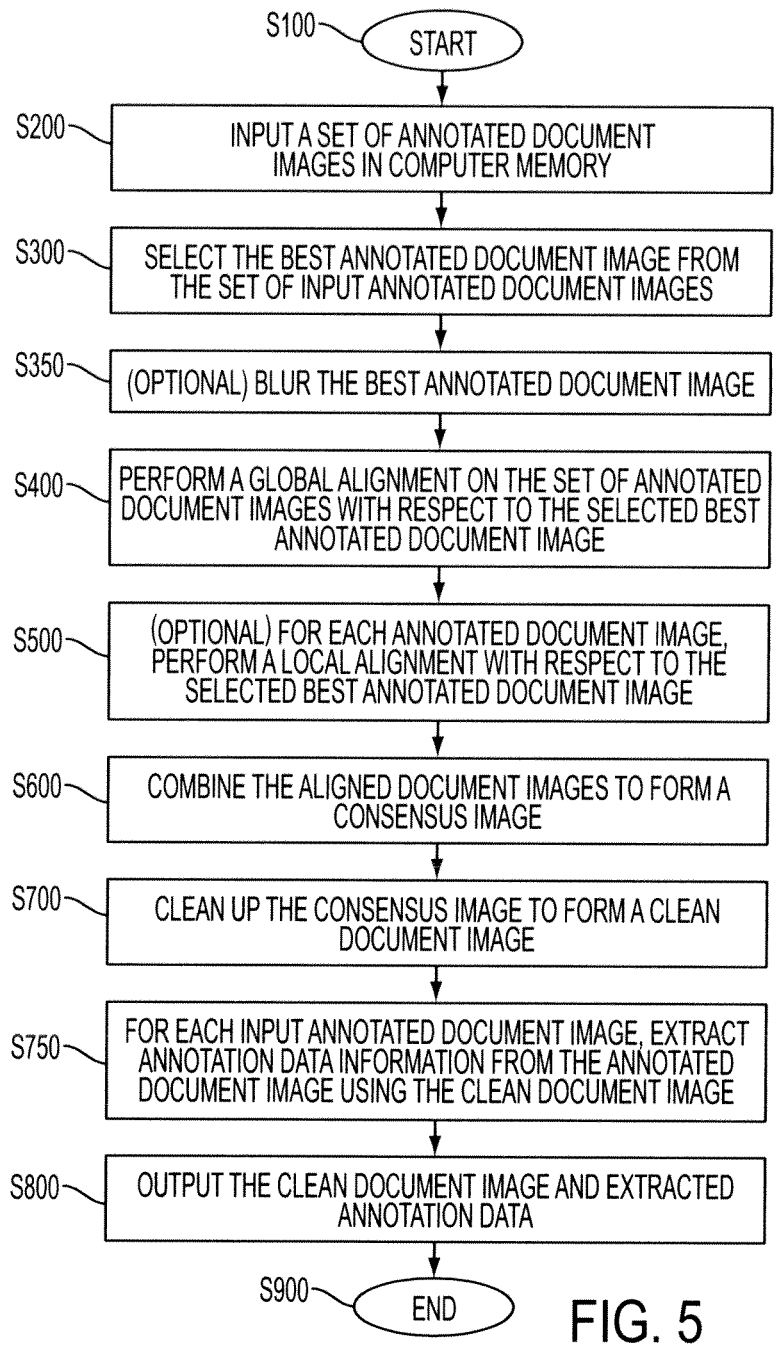
FIG. 5 is a flow diagram illustrating the operations performed by the exemplary system of FIG. 4.

With reference to FIG. 5, an exemplary method for reconstructing a clean document from a set of annotated document images is illustrated. The method may employ the system 100 illustrated in FIG. 4. It is to be appreciated that the exemplary method may include fewer, more, or different steps from those shown and need not proceed in the order illustrated. The method illustrated in FIG. 5 may be implemented in a computer program product that may be executed on a computer. The computer program product may be a tangible computer-readable recording medium (such as a disk or other memory storage device) on which a control program is recorded, or may be a transmittable carrier wave in which the control program is embodied as a data signal. The illustrated method may be entirely automated or may include some user input, as noted herein.

The method begins at step S100. At step S200, the clean document reconstruction system 100 receives a set of at least two annotated document images 104 into computer memory 106 via input device 102. Each annotated document image in the set 104 should correspond to the same form or clean document image, and have only differing annotations. For example, the annotated document images 4 and 6 of FIGS. 2 and 3 both correspond to the clean document image (i.e., a blank form) 2 of FIG. 1 since images 4 and 6 are a superset of clean image 2 that contain annotations such as 10*a* and 10*b*, respectively. In one embodiment, two annotated document images correspond to the same clean document image if the two annotated document images share at least a certain proportion (for example, 50%) of pixels in common. For example, two annotated document images may share a certain amount of text having the same line breaks and same font, which are in the same positions relative to the dimensions of the image. The quality of the output clean document image depends at least in part on the number of input annotated document images. In the exemplary method and system, at least 10, and in one embodiment about 20 or more black-and-white, grayscale, and/or color images are input into the system 100. The annotated document images may be in any format recognizable by the processing software such as TIFF, JPG, GIF, PDF, etc. Optionally, grayscale or color images may be converted to binary (black and white) images before processing.

At step S300, the representative scan selection module 110 selects an annotated document image from the set of input annotated document images 104 and sets the selected annotated document image as the representative annotated document image 150. The representative annotated document image 150 may be, but is not required to be, removed from the set of input annotated document images 104. In an alternate embodiment, the representative annotated document image 150 may be manually selected by a user. Factors that may determine whether an annotated document image is suited to being selected as the representative annotated document image include, but are not limited to, the skew, crispness, and line quality of the annotated document image. For example, an annotated document image may be considered as the representative annotated document image if it is not skewed with respect to the margins of the document, has crisp, sharp edges, and has lines that are dark and easily distinguishable. Any or all of these factors may be considered when determining the representative annotated document image 150. The aim is to select the best annotated image (the one expected to be most similar in structure to the clean image from which it was originally created) as the representative annotated document image, although the processing software may not necessarily select the annotated image that a human would consider to be the best. In the exemplary embodiment, the skew of a document image is given more weight than the crispness or line quality of the document image when determining the representative annotated document image. For explanatory purposes, FIG. 2 is selected here as the best annotated image.

At step S350, the representative scan selection module 110 (or any other suitable module) optionally blurs the set of input annotated document images 104 and the selected representative annotated document image 150. The blurring algorithm and/or component used may implement any suitable blurring algorithm. For example, certain embodiments implement the well-known Gaussian blur algorithm to blur the annotated document images 104, 150. In other embodiments, the black pixels of the document image are dilated. Dilation denotes the operation where the value of the output pixel is the maximum value of all the pixels in the input pixel's neighborhood. For example, in a binary image, if any of the pixels in the input pixel's neighborhood are black, the output pixel is set to black. The purpose of blurring is to ensure that even relatively small objects, such as periods and lines of one or two pixels width can be aligned.

At step S400, the global alignment module 112 performs a global alignment that aligns each annotated document image $A_1, A_2, \ldots, A_n$ in the set of input annotated document images 104 with respect to the selected representative annotated document image B 150. Briefly, the global alignment module 112 selects a number of initial blocks 478 (FIG. 13) (for example, in the exemplary embodiment, about 20 to 50 blocks) in $A_i$ and identifies their corresponding (i.e., matching) initial blocks 478 in B, using cross-correlation and a rough-to-fine hierarchical search. In the exemplary embodiment, the selected initial blocks 478 in document image $A_i$ are complex blocks that contain many black (or dark, in the case of color) pixels. For example, a initial block 478 may be selected if it contains over 10% black pixels. The initial blocks 478 may contain at least 50 or at least 100 pixels, and in some embodiments, up to about 100,000 pixels. The selected initial blocks may all be the same size and shape or may be of different shapes and/or sizes. In one embodiment, the initial blocks 478 are rectangular, although other shapes are contemplated. In general the initial blocks 478 occupy an area which is about 5% or less of the area of the image.

Figure 6:
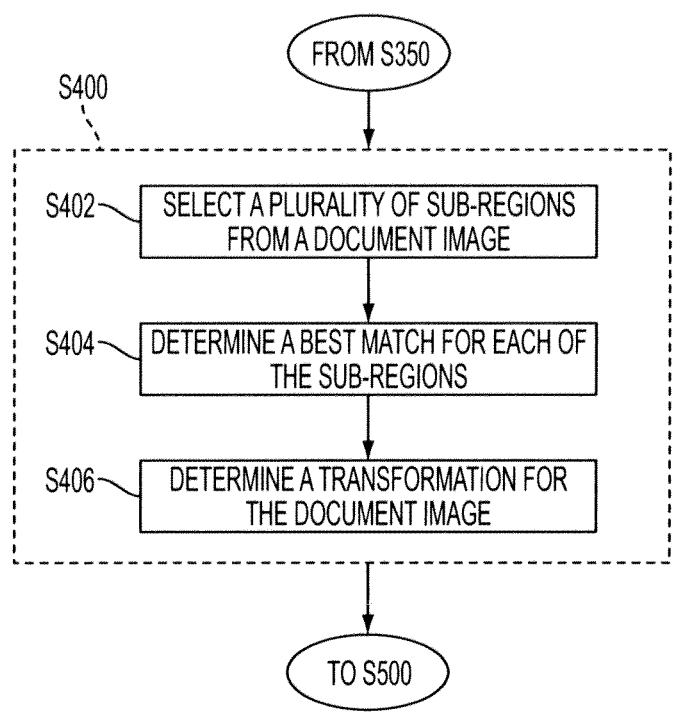
FIG. 6 is a flow diagram illustrating in more detail the global alignment method shown in FIG. 5.

Each matching pair of initial blocks 478 (FIG. 13) gives a pair of points (such as the center points of the two blocks): (x,y) in $A_i$ and (x', y') in B. Using standard least-squares methods (with outlier rejection to eliminate bad matches), the global alignment module 112 computes a transformation matrix that approximately maps the points in $A_i$ to the points in B. The transformation matrix may allow only rigid motions such as rotation and translation. In certain embodiments, the transformation matrix may also allow uniform scaling, or different scaling in x and y directions (as often occurs in fax machines) and/or also provide for additional transformations for correcting deformities that include, but are not limited to, page curl, keystoning, etc. Step S400 is illustrated in greater detail in FIG. 6. The global alignment method starts from step S350 and begins at S402, and is performed for each annotated document image $A_i$ with respect to the selected representative annotated document image B 150.

At step S402, the global alignment module 112 selects a plurality of initial blocks in the image $A_i$. For example, FIG. 13 illustrates the annotated document image 6 of FIG. 3 with a plurality of initial blocks 478 selected. In the exemplary embodiment, 30 or more initial blocks 478 are selected. Additionally, in certain embodiments, the initial blocks 478 are at least one of uniformly sized, non-overlapping, and uniformly distributed across the document image $A_i$. The initial blocks 478 may be adjacent to each other, or may be separated by any size space. For a 300 DPI document image, an initial block 478 will typically have a size of 128×128 pixels. The initial blocks may, but need not, be selected at random, selected pseudo randomly, or selected by a user. In embodiments where the initial blocks are selected pseudo randomly, the initial blocks may be selected with the aid of a user and/or selected so as to meet certain conditions.

At step S404, the global alignment module 112 determines a closest match for each of the initial blocks 478 (FIG. 13) of the document image $A_i$ with respect to corresponding initial blocks 478 in document image B. Initially, the initial blocks 478 of $A_i$ are provisionally matched with initial blocks 478 of B by using the same x and y coordinates of the $A_i$ initial block to locate the initial block in B. A closest match for an initial block of a document image is determined by finding the initial block of the selected document image B that most closely resembles the initial block 478 of the document image $A_i$ under a valid transformation. Valid transformations include, but are not limited to, translations of the initial block of the document image, rotations of the initial block of the document image, scaling of the initial block of the document image, and affine transforms of the initial block of the document image. A closest match for an initial block 478 of the document image may also be associated with a quality score corresponding to the quality of the match. In certain embodiments, the quality of an initial block of the selected document image is assessed on a scale of zero to one, where zero indicates no match found and one indicates a perfect match. A perfect match only exists if some initial block of the selected document image exactly matches the initial block of the document image under a valid transformation, such as a rotation. Under such embodiments, the quality score may be defined as the number of overlapping black pixels between the initial block of the document image (following any applied transformations) and the initial block of the selected document image divided by the average number of black pixels in the initial block of the document image and the initial block of the selected document image corresponding thereto. Additionally, in certain embodiments, if a quality score for a closest match is below a confidence threshold, the corresponding initial block of the document image may be ignored (no match) for the remainder the method S400. A quality score is likely to be lower than the confidence threshold if the corresponding initial blocks of the document images contain only (or mostly) annotated data.

Figure 7:
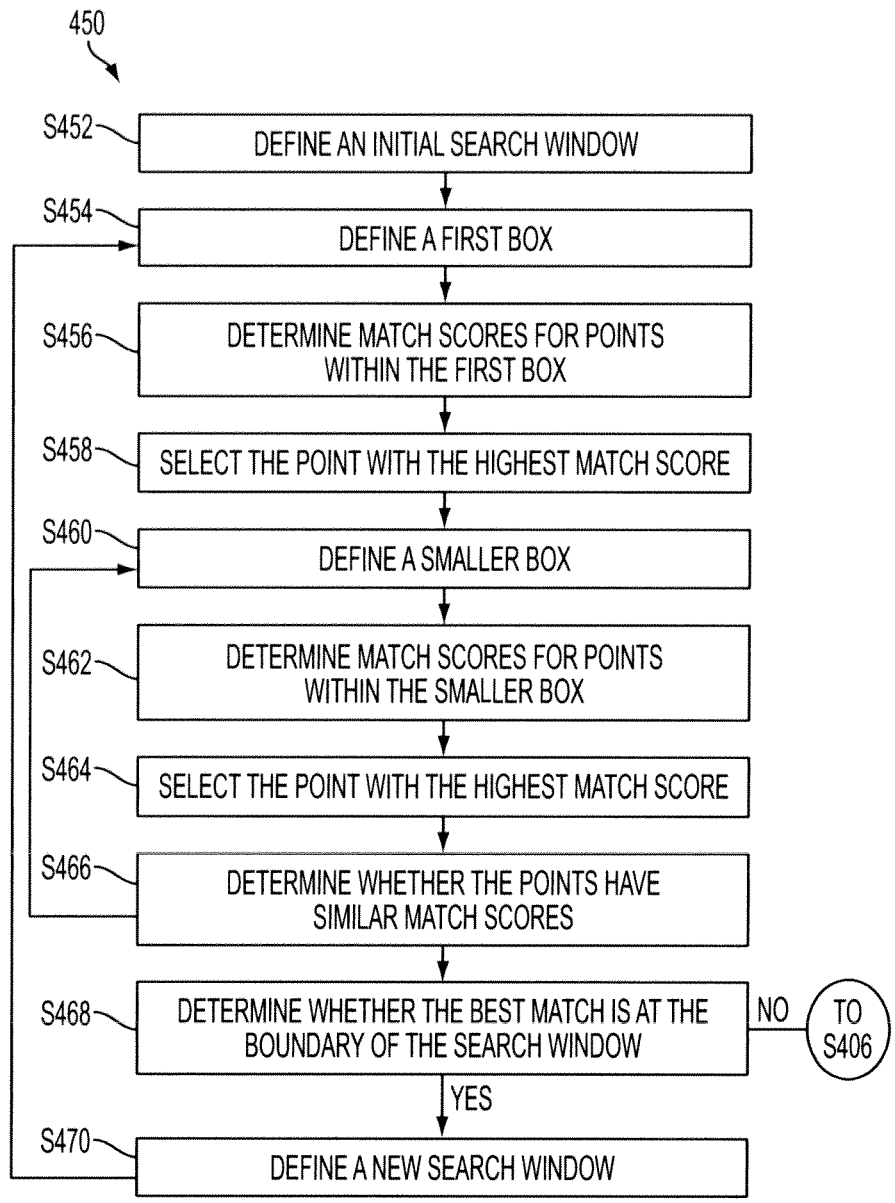
FIG. 7 is a flow diagram illustrating in more detail a rough-to-fine hierarchical search used in the global alignment method of FIGS. 5 and 6.
Figure 8:
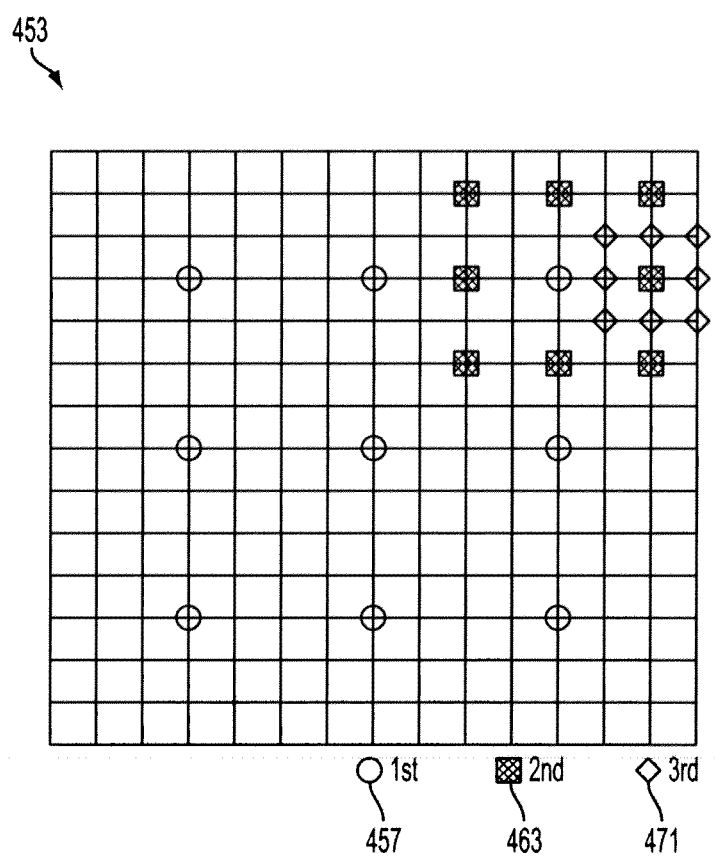
FIG. 8 graphically illustrates a search window used by the rough-to-fine hierarchical search illustrated in FIG. 7.

To find the closest match for an initial block 478 (FIG. 13) of the document image, a rough-to-fine hierarchical search procedure may be employed. With reference to FIG. 7, a hierarchical search procedure 450 is illustrated as applied to the exemplary 15 pixel×15 pixel search window 453 of FIG. 8. For illustrative purposes, search window 453 is also shown within an initial block 478 in FIGS. 2 and 3. The hierarchical search procedure begins at step S452 by defining a search window 453 centered on an initial block of the document image $A_i$. The search window is used to find a block in the selected representative image B that corresponds to the selected initial block of $A_i$. Although more sophisticated methods of determining the approximate location may be employed, in certain embodiments, the location of the initial block of the document image is simply mapped to the corresponding location within the selected document. For example, consider an initial block at a location $(x_0, y_0)$ in a document image having a width $w_0$ and a height $h_0$. If the selected document image has a width $w_1$ and a height $h_1$, the corresponding location $(x_1, y_1)$ within the selected document could be defined as follows.

$$x_1 = \frac{w_1}{w_0} * x_0 \qquad (1)$$

$$y_1 = \frac{h_1}{h_0} * y_0 \qquad (2)$$

At step S454, the global alignment module 112 defines a first box (defined by points 457) smaller than the search window 453 and centered within the search window.

At step S456, the global alignment module 112 determines match scores for a set of points 457 located within the first box. In certain embodiments, match scores are determined for nine spaced points which are located at the corners, side midpoints and center of the box, although fewer or more spaced points may be selected. A match score for a point is determined by attempting to match the initial block of the document image $A_i$ to a region of the selected document image B proximate the point. The operator may define proximate as they see fit, subject to the understanding that the broader the operator defines proximate, the slower the hierarchical search procedure 450 becomes. The point having the highest match score (in this illustration, the upper-right point 457) is then selected at step S458. For example, the search windows 453 of FIGS. 2 and 3 each contain a dollar sign ($), which will provide high match scores for the corresponding points.

At step S460, a box smaller than the previous box and centered around the closest match from the previous box is defined (by points 463).

At step S462, the global alignment module 112 determines match scores for points located within the smaller box in a manner similar to the first box. The point having the highest match score (in this case, the middle right point 463) is selected at step S464.

At step S466, the global alignment module 112 determines whether the points of the smaller box have similar match scores. For instance, the match scores of points 463 are compared to each other to determine whether the differences between the points fall within a given threshold (for example, from 0.0 to 1.0). If the points of the smaller box are not similar to each other, steps S460, S462, S464 and S466 are repeated.

At step S468, the global alignment module 112 determines whether the closest match is at the boundary of the search window 453. For example, if the any of the right points represented by points 471 are determined to be the closest match for that box, then the selected point is on the boundary of the search window. If the closest match is not on the boundary, the method 450 proceeds to S406. Otherwise, the method 450 defines a new search window at step S470 centered around the closest match and repeats steps S454 through S468. At this point in the method, the global alignment module 112 has identified a set of up to nine points in document image $A_i$ that correspond to a set of points in document image B.

Referring back to FIG. 6, at step S406, the global alignment module 112 determines a transformation matrix for the document image $A_i$ that, when applied to $A_i$, will align document image $A_i$ with document image B. This determination is made using a least squares analysis to minimize the difference between the closest matches and the corresponding initial blocks 478 (FIG. 13) of the document image. Basically, the goal is to map the points in the initial blocks of the document image $A_i$ to the points in the corresponding initial blocks of the selected document image B. In doing this, the least squares analysis may account for one or more valid transformations, where valid transformations, include, but are not limited to, rotations, translations, scaling, page curl, keystoning, etc. In certain embodiments, the least squares analysis may also include outlier rejection to make the process less sensitive to falsely matched pairs of points.

To illustrate, suppose the location of an initial block $r_s$ within the selected document image B can be modeled as a function $f$ of the location of the corresponding initial block $r_d$ within the document image $A_i$. Further, suppose the function $f$ takes a vector $\beta$ of variable parameters, which control how the function $f$ maps between two initial blocks. Parameters may include the amount of rotation, scaling, translation, etc. The sum of the squares of the error S can then be defined as $$S = \sum_{i=1}^{n} d((x_i, y_i), f(x_i, y_i))^2, \qquad (3)$$

where n corresponds to the number of initial blocks selected in step S402, f( ) is a function that applies a transformation to the point $(x_i, y_i)$ that results in a new point, d is a measure of distance between point $(x_i, y_i)$ and translation point $f(x_i, y_i)$, i corresponds to the ith initial block within the selected document image B (i.e., the closest match) and $f(x_i, y_i)$ corresponds to the location of the ith initial block within the document image $A_i$.

Having defined the sum of squares S, the transformation for the document image $A_i$ is determined by solving for the variable parameters of the vector $\beta$. Namely, suppose the vector $\beta$ has m parameters and $\beta_j$ corresponds to the jth parameter. The solution to the jth parameter can be determined by solving for the parameter $\beta_j$ using conventional techniques such as linear equations.

As should be appreciated, the variable parameters determined in this way minimize the sum of the squares of the errors involved with mapping the initial blocks of the document image to initial blocks 478 (FIG. 13) of the selected document. Assuming the transformation matrices tend to be rigidly applied across the entirety of the document image, the variable parameters can be used to globally define a transformation for the document image. This globally defined transformation may be an average of the transformation matrices computed for document image $A_i$. Thus, at the end of step S406, the global alignment module 112 has determined a single transformation matrix 152 for each document image $A_i$.

Figure 9:
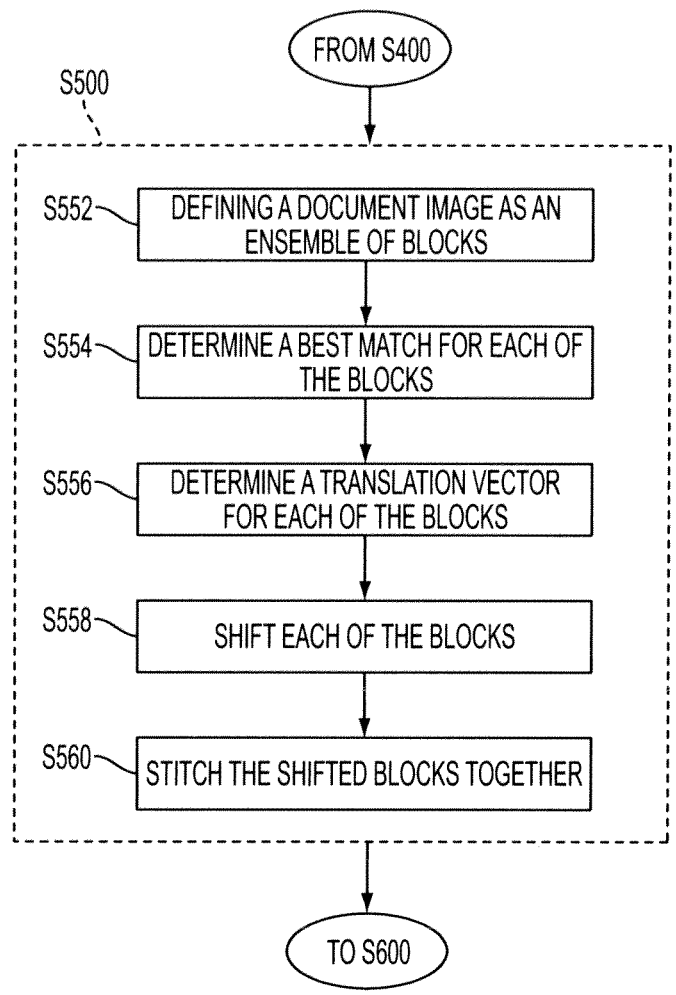
FIG. 9 is a flow diagram illustrating in more detail the local alignment method described by FIG. 5.

Referring once more to FIG. 5, at step S500, the local alignment module 114 optionally performs a further local alignment on each annotated document image $A_1, A_2, \ldots, A_n$ in the set of input annotated document images 104 with respect to the selected representative annotated document image B 150. This step helps to account for the fact that the global alignment transformation is an average transformation across multiple initial blocks 478 (FIG. 13). Each region of the document image $A_i$ has its own, slightly different transformation which are all individually computed and applied to the document image $A_i$. Briefly, a document image $A_i$ is locally aligned to B by partitioning $A_i$ into a grid of nonoverlapping (or only partially overlapping) secondary blocks 480 (FIG. 14). For example, 128×128 pixels is a reasonable secondary block size match for each secondary block in $A_i$ with a corresponding block in selected representative document image B is determined. These matchings can be considered as a vector field that assigns a translation vector to the center of the block in $A_i$ to obtain the corresponding block in B. Initial vectors are determined by the transformation matrix computed in the global alignment step (S400), but final vectors may deviate from the initial vectors by up to about 5 pixels in each of x and y. The vector for a secondary block that cannot be matched confidently can be extrapolated from its neighbors using a Laplacian smoothing process, in which the vector is set to the average of its (usually) four neighbors. To find the translation vector at any point (x,y) in image $A_i$, bilinear interpolation (i.e., finding an estimated transformation between two points) is used from the translation vectors at the four grid points surrounding (x,y). The aligned image with the set of transformation vectors applied is denoted $A'_i$. Step S500 is illustrated in greater detail in FIG. 9. The optional local alignment method S500 starts after step S400 and begins at S552. The method S500 is performed for each annotated document image $A_i$ and for each secondary block with respect to the selected representative annotated document image B 150.

At step S552, the local alignment module 114 divides document image $A_i$ into a set of secondary blocks 480 (FIG. 14) encompassing the entirety of the document image, where each of the secondary blocks 480 has neighbors on the top, bottom, left and right (excluding secondary blocks on the border). As should be appreciated, a secondary block 480 is simply a region of the document image. In certain embodiments, the secondary blocks 480 are at least one of nonoverlapping, overlapping by a small amount (e.g., 10 pixels) to prevent gaps between secondary blocks 480, and uniformly sized. The local alignment module 114 or a user may select the size of the secondary blocks 480, optionally after weighing at least the following considerations: 1) the smaller the secondary block size, the more processing time that is needed; and 2) the larger the secondary block size, the less effective the local alignment is. In the exemplary embodiment, a block size for a 300 DPI (dots per inch) document image is 128×128 pixels, i.e., each secondary block 480 may have an area of at least 1 cm² and an image may be divided into at least 50 or at least 100 secondary blocks, e.g., up to 5000 secondary blocks.

At step S554, the local alignment module 114 determines a closest match for each of the blocks in $A_i$ with a block in document B. A closest match for a block is determined by finding the initial block 478 (FIG. 13) of the selected document image B that most closely resembles the block under a valid transformation. Further, a closest match may include a quality score corresponding to the quality of the match. Thus, as should be appreciated, a closest match for a block may be determined in the same way as a closest match for an initial block 478 of the document image, discussed in connection with FIG. 7, whereby attention is directed to the foregoing discussion.

At step S556, the local alignment module 114 determines a translation vector for each block in document image $A_i$ corresponding to the closest matching secondary block 480 (FIG. 14) in selected document image B determined in step S554. A translation vector for a secondary block 480 in document image $A_i$ is simply the amount of translation the secondary block 480 needs to align with its closest match in selected document image B. In certain embodiments, if the quality score for a closest match is below a confidence threshold, the translation vector of a secondary block 480 may be extrapolated from the translation vectors of its neighbors. Namely, the translation vector for such a secondary block 480 can be set to the average translation vector of its neighbors.

Figure 10:
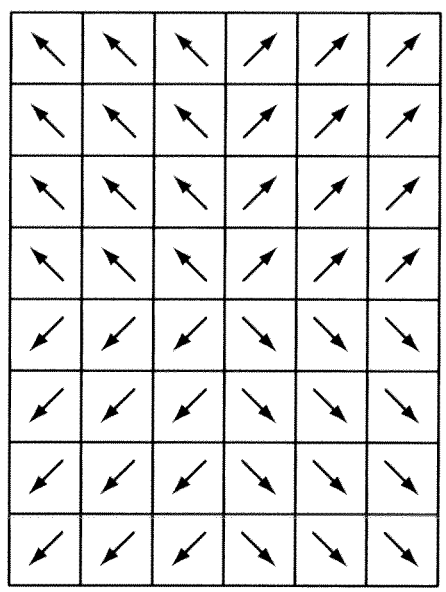
FIG. 10 graphically illustrates a distortion map with set of translation vectors to be applied to an annotated document image.

With reference to FIG. 10, a distortion map for a document image is illustrated that shows a set of translation vectors as applied to a document image. In the example, the document image is divided into a 6×8 grid of secondary blocks 480 (FIG. 14), although fewer or more secondary blocks may be used. Each block is associated with a translation vector (indicated simply by arrows to show the translation direction). Although only translation vectors for a discrete set of blocks are determined, the translation vector for any point in the document image $A_i$ can be determined using bilinear interpolation from the translation vectors at four grid points surrounding the point.

At step S558, the local alignment module 114 shifts each of the blocks in document image $A_i$ by applying the determined translation from step S556.

At step S560, the local alignment module 114 creates transformed document image $A'_i$ by assembling (stitching together) the shifted blocks from step S558. Accordingly, after step S560 is performed, a set of transformed document images 154 $A'_1, A'_2, \ldots, A'_n$ are created, where n is the number of document images in the input set of document images 104. Control is then passed to S600.

At step S600, the consensus image forming module 116 combines the aligned document images 154 $A'_1, A'_2, A'_n$, to form a consensus image 156. There are multiple ways to combine the aligned document images 154 to form a consensus image 156. Optionally, any color aligned document images may be transformed into a grayscale or binary (black and white) image before further processing. Any of the following example methods of combining the aligned document images may be used separately or in combination. One way is to simply sum, for a given property (such as color value or binary value) all the images and then threshold the sum at a suitable value to turn it into a black-and-white image, as shown in FIG. 11. The sum is pixel-wise, so that the consensus pixel C(x,y) at position (x,y) is thresholded from the sum:

$$B(x,y)+\Sigma^n_i A'_i(x,y) \leq t. \quad (5)$$

where B(x,y) and $A'_i(x,y)$ are pixel color values (e.g., 0 for white, 1 for black), i is an index ranging from 1 to n, and n is the number of annotated document images input to the system 100 and t is the threshold. In other words, the pixel at position (x,y) is obscured from the consensus image if its computed sum is not greater than the threshold. For example, for 50 annotated document images, the threshold may be set such that at least, for example, 30 of the document images $A'_i$ have a black pixel at location (x,y) for the pixel in the composite image to be set to black, or in the case of grayscale and color images, a summed color property (such as intensity) above a certain threshold. The color/intensity of pixel at (x,y) in selected document image B may also counted toward the sum as shown in Eqn. 5.

Another way to form the consensus image is by voting process wherein each pixel at location (x,y) in document images B and $A'_1, A'_2, \ldots, A'_n$ is counted if that pixel is black, or in the case of grayscale and color images, has a color property (such as intensity) above a certain threshold. For example, the consensus image forming module 116 may require that two-thirds of the pixels at (x,y) in document images B and $A'_1, A'_2, \ldots, A'_n$ be black for C(x,y) to be black.

Yet another way to form the consensus image is to treat the selected representative document image B specially. For example, C(x,y) is set to black only if B(x,y) is black and two-thirds of $A'_1(x,y), A'_2(x,y), A'_n(x,y)$ are black.

After step S600 is performed, a consensus image 8 such as that shown in FIG. 11 is created. Because the consensus image 8 is formed from annotated document images such as images 4 and 6 illustrated FIGS. 2 and 3, the consensus image 8 will contain well-defined lines (such as the borders) and features such as the labels "Food" and "Entertainment:". Additionally, there may be noise 12 formed from scanning anomalies and annotations on the annotated document images 104 that have only scattered pixels that overlap. This noise 12 may be removed from the consensus image 8 to create a clean document 2.

For example, at step S700, the clean up module 118 cleans the consensus image 8 by removing salt-and-pepper noise, isolated white and black pixels and small connected components of pixels to form the clean document image 2. The clean up module 118 may also repair broken horizontal and vertical lines. This may be performed using the system and method disclosed in U.S. Pat. No. 6,968,085 entitled DOCUMENT MATCHING AND ANNOTATION LIFTING incorporated above during the clean up process.

At step S750, the annotation extraction module 119 extracts annotation information data 157 from each of the input annotated document images 104 by comparing the input document images 104 against the clean document 2. In the exemplary embodiment, the annotation extraction module 119 identifies bounding boxes or areas within the clean document corresponding to empty fields and corresponding bounding boxes or areas in the annotated document image where there is image data and performs a differential (diff) operation to extract the annotation information data from the annotated document image. The extracted annotation information data may include the annotation itself, the bounding box coordinates, and an identifier that identifies the annotated document image from which the annotation was extracted.

The bounding boxes are identified in the clean document based on the geometric layout. For example, in FIG. 1, the box bounded by points P1, P2, P3, P4 is identified as a distinct element of the clean document 2 since it has lines connecting P1, P2, P3, P4 to form a rectangular shape (which would be common in a blank form). The corresponding box is then determined in aligned annotated document image 4 of FIG. 2 using the same relative points P1, P2, P3, P4. After the bounding boxes are determined, a diff operation is performed to extract the pixels present in the annotated bounding box that are not present in the clean bounding box. In one embodiment, this step may be performed on the original annotated image, rather than on the aligned annotated image. After the diff operation is performed with respect to bounding box P1, P2, P3, P4 of annotated image 4, the annotated data information of FIG. 12 is obtained. In this example, the annotated data information will contain the notation that says "Apples, Bananas, Pizza, Cookies, Butter", an identifier that identifies annotated document image 4, and the coordinates P1, P2, P3, P4 which may be used by other components to know from where exactly the information was extracted. The extracted image data from the annotated image may be processed using OCR or word recognition techniques, in the case of handwritten annotations, to determine the text content.

Furthermore, after the annotated data information is extracted, the annotation extraction module 119 may optionally process the annotated data using a word detection algorithm such as those described in U.S. application Ser. No. 12/169,101, entitled WORD DETECTION METHOD AND SYSTEM, U.S. application Ser. No. 12/212,964, entitled HANDWRITTEN WORD SPOTTER USING SYNTHESIZED TYPED QUERIES, and U.S. application Ser. No. 12/567,920, entitled HANDWRITTEN DOCUMENT CATEGORIZER AND METHOD OF TRAINING incorporated above.

At step S800, the clean document reconstruction system 100 outputs the clean document image 2 and extracted annotation data 157 to memory 106, or to another output device such as client terminal 130 or a printer 132 via the output device 120. Optionally, the client terminal 130, printer 132 and/or any other output device may be connected via a network 134 such as the internet.

The method ends at S900.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for reconstructing a document from annotated document images, comprising:
receiving a set of at least two annotated document images into computer memory, the annotated document images each comprising static elements and annotated data;
selecting a representative image from the set of annotated document images based on at least one of:
a measure of skew of an annotated document image,
a measure of crispness of the annotated document image, and
a measure of line quality of the annotated document image;
performing an alignment on each annotated document image with respect to the selected representative;
forming a consensus document image based on the aligned annotated document images in which at least some annotation data derived from the aligned annotated document images is obscured; and
outputting the consensus document image.

2. The method of claim 1, further comprising:
forming a clean document based on the consensus document image; and
outputting the clean document.

3. The method of claim 2, wherein the clean document is a document with a fixed page layout containing static elements intended to be reproduced on all like documents.

4. The method of claim 2, wherein the forming a clean document based at least on the consensus document image comprises removing salt-and-pepper noise, isolated white and black pixels and repairing broken lines.

5. The method of claim 2, further comprising extracting annotation information data from the set of annotated document images by comparing each annotated document image with the clean document.

6. A computer-implemented method for reconstructing a document from annotated document images, comprising:
receiving a set of at least two annotated document images into computer memory, the annotated document images each comprising static elements and annotated data;
performing an alignment on each annotated document image with respect to at least one other annotated document image in the set of annotated document images;
forming a consensus document image based on the aligned annotated document images in which at least some annotation data derived from the aligned annotated document images is obscured;
forming a clean document based on the consensus document image; and
extracting annotation information data from the set of annotated document images by comparing each annotated document image with the clean document, including:
identifying bounding boxes within the clean document and corresponding bounding boxes within the annotated document image;
performing a differential operation to extract the annotation pixels contained within each box of the annotated document image that is not present in the corresponding box of the clean document; and
for each bounding box, outputting the size and location, the extracted annotation pixels, and an identifier that identifies the annotated document image from which the annotation data is extracted.

7. A computer-implemented method for reconstructing a document from annotated document images, comprising:
receiving a set of at least two annotated document images into computer memory, the annotated document images each comprising static elements and annotated data;
selecting a representative image from the set of annotated document images;
performing a global alignment on each annotated document image in the set of annotated document images with respect to the selected representative image;
forming a consensus document image, based on the selected representative image and the set of annotated document images, in which at least some annotation data derived from the aligned annotated document images is obscured, and wherein the selected representative image and the set of annotated document images are blurred before forming a consensus document image; and
outputting the consensus document image.

8. A computer-implemented method for reconstructing a document from annotated document images, comprising:
   receiving a set of at least two annotated document images into computer memory, the annotated document images each comprising static elements and annotated data;
   selecting a representative image from the set of annotated document images;
   performing a global alignment on each annotated document image in the set of annotated document images with respect to the selected representative image, the performing a global alignment comprising, for each annotated document image:
      selecting a number of blocks in the annotated document image;
      identifying a same number of blocks in the representative image that correspond in size and location to the blocks in the annotated document image; and
      computing a transformation matrix that maps at least one point in each block of the annotated document image to at least one point in the corresponding block in the representative image;
   forming a consensus document image, based on the selected representative image and the set of annotated document images, in which at least some annotation data derived from the aligned annotated document images is obscured; and
   outputting the consensus document image.

9. The method of claim 8, wherein the transformation matrix is an average of the transformations for each block in the annotated document image.

10. The method of claim 8, wherein the mapping of at least one point in each block of the annotated document image to at least one point in the corresponding block in the representative image includes computing a measure of overlap of black pixels in the block of the annotated document and black pixels the block of the representative document.

11. The method of claim 10, wherein computing a measure of overlap of black pixels comprises calculating a quality score defined as the number of overlapping black pixels between the block of the annotated document image and the block of the representative image divided by the average number of black pixels in the block of the annotated document image and the corresponding block of the representative image.

12. The method of claim 8, wherein computing a transformation matrix includes the use of a rough-to-fine hierarchical search.

13. The method of claim 8, wherein the transformation matrix allows for rotation and translation.

14. The method of claim 13, wherein the transformation matrix additionally allows for at least one of the following:
   uniform scaling,
   correction of page curls, and
   correction of keystoning.

15. A computer-implemented method for reconstructing a document from annotated document images, comprising:
   receiving a set of at least two annotated document images into computer memory, the annotated document images each comprising static elements and annotated data;
   performing an alignment on each annotated document image with respect to at least one other annotated document image in the set of annotated document images;
   forming a consensus document image based on the aligned annotated document images in which at least some annotation data derived from the aligned annotated document images is obscured, the forming the consensus document image comprising determining consensus pixels, each consensus pixel having a unique position in the consensus document image, including summing a property of the corresponding pixels in each of the aligned annotated document images and comparing the sum against a given threshold; and
   outputting the consensus document image.

16. The method of claim 15, further comprising:
   selecting a representative image from the set of annotated document images; and
   performing a global alignment on each annotated document image in the set of annotated document images with respect to the selected representative image.

17. The method of claim 16, wherein the forming of the consensus document image is based on the selected representative image and the set of annotated document images.

18. The method of claim 16, wherein selecting a representative image from the set of annotated document images is based on at least one of the following:
   a measure of skew of an annotated document image,
   a measure of crispness of the annotated document image, and
   a measure of line quality of the annotated document image.

19. The method of claim 16, further comprising performing a local alignment on the set of annotated document images, wherein the local alignment includes, for each annotated document image in the set of annotated document images:
   partitioning the annotated document image into a set of secondary blocks;
   determining a match for each secondary block in the annotated document image with a respective secondary block in the representative image; and
   for a plurality of the determined matched secondary blocks, based on the global alignment information, creating a vector field that assigns a translation vector to each secondary block in the annotated document image to obtain the corresponding block in the representative image.

20. The method of claim 19, wherein the vector field uses a Laplacian smoothing process to estimate the translation vector for at least one secondary block, wherein the Laplacian smoothing process extrapolates the vector by averaging the vectors from secondary blocks neighboring the at least one secondary block.

21. The method of claim 15, wherein the sum includes a weighted value of the corresponding pixel in the representative image.

22. A computer program product comprising a non-transitory recording medium storing instructions which, when executed on a computer, perform the method of claim 1.

23. A computer-based system for reconstructing a clean document from annotated document images, comprising:
   a computer processor;
   computer memory which stores:
      a representative scan selection module,
      a global alignment module,
      a consensus image forming module, and
      a clean up module;
   wherein the representative scan selection module is operative to:
      receive a set of at least two annotated document images, and
      select a representative image from the set of annotated document images;

wherein the global alignment module is operative to:
perform a global alignment on the set of annotated document images with respect to the selected representative image, comprising:
selecting a number of blocks in the annotated document image;
selecting the same number of blocks in the representative image that correspond in size and location to the blocks in the annotated document image; and
computing a transformation matrix that maps at least one point in each block of the annotated document image to at least one point in the corresponding block in the representative image;
wherein the consensus image forming module is operative to:
form a consensus document image based at least on the aligned annotated document images; and
wherein the clean up module is operative to:
form a clean document based at least on the consensus document image, and
output the clean document;
the computer processor implementing the modules.

24. The system of claim 23, further comprising a local alignment module operative to, for each annotated document image in the set of annotated document images:
partitioning the annotated document image into a grid of secondary blocks;
determining a match for each block in the annotated document image with a block in the representative image; and
using the determined matched secondary blocks and global alignment information, creating a vector field that assigns a translation vector to the center of each block in the annotated document image to obtain the corresponding block in the representative image.

25. The system of claim 23, further comprising an annotation extraction module operative to extract annotation information data from the set of annotated document images by comparing each annotated document image with the clean document by performing a process that includes:
identifying bounding boxes within the clean document and corresponding bounding boxes within the annotated document image;
performing a differential operation to extract the annotation pixels contained within each box of the annotated document image that is not present in the corresponding box of the clean document; and
for each bounding box, outputting the size and location, the extracted annotation pixels, and an identifier that identifies the annotated document image from which the annotation data is extracted.

26. A computer program product comprising non-transitory media storing instructions which, when executed on a computer, perform the method of claim 15.

* * * * *